W. CLARK.
King Bolt for Carriages.
No. 101,227.
Patented March 29, 1870.
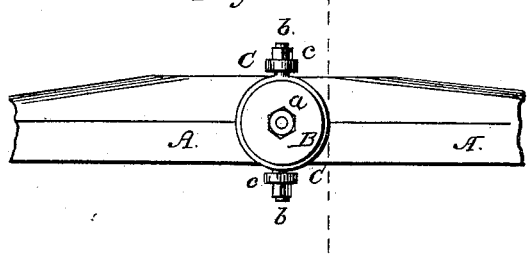
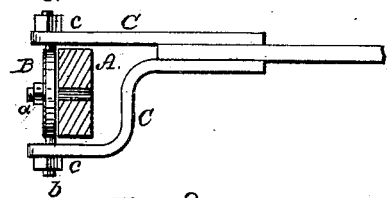
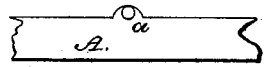

United States Patent Office.

WILLIAM CLARK, OF JOHNSONVILLE, NEW YORK.

Letters Patent No. 101,227, dated March 29, 1870.

IMPROVEMENT IN KING-BOLT FOR CARRIAGES.

The Schedule referred to in these Letters Patent and making part of the same.

*To all whom it may concern:*

Be it known that I, WILLIAM CLARK, of Johnsonville in the county of Rensselaer and State of New York, have invented a new and improved King-Bolt for Carriages; and I do hereby declare that the following is a full, clear, and exact description thereof, which will enable others skilled in the art to make and use the same, reference being had to the accompanying drawings forming part of this specification, in which—

Figure 1 represents a front view of an axle provided with my improved king-bolt.

Figure 2 is a vertical transverse section of the same.

Figure 3 is a detail rear view of the middle portion of the axle.

Similar letters of reference indicate corresponding parts.

The object of this invention is to provide a king-bolt attachment to the axles of wheeled vehicles, whereby the horizontal as well as vertical oscillations of the axles are permitted without the use of a fifth wheel, or other complicated apparatus.

The invention consists in pivoting the king-bolt by means of a horizontal pin to the face of the axle, allowing the latter to swing on said pin as well as the pivot in every direction.

A in the drawing represents the axle of a wagon, carriage, or other wheeled vehicle.

To the middle of this axle is firmly secured in suitable manner a forward-projecting pin, *a*, which serves to support a disk, B, as shown, the said disk being free to revolve on said pin.

From the edges of the disk project diametrically opposite each other, two pins, *b b*, which constitute, together with the disk itself, the king-bolt.

The pins *b* are fitted through the forked front part of the perch C, as shown, and are held therein by means of nuts or keys, *c*. The axle A can by this arrangement turn on the pin *a*, to adjust itself to uneven positions of the wheels, and it can also turn on the king-bolt *b* B, for steering the vehicle.

All suitable kinds of springs may be used in connection with this kind of king-bolt attachment.

Having thus described my invention,

I claim as new and desire to secure by Letters Patent—

The king-bolt, consisting of pins that project from a disk pivoted to the face of an axle, as set forth.

WILLIAM CLARK.

Witnesses:
GEO. W. MABEE,
ALEX. F. ROBERTS.